(No Model.)
N. O. STARKS
CORN PLANTER.
No. 251,650. Patented Dec. 27, 1881.
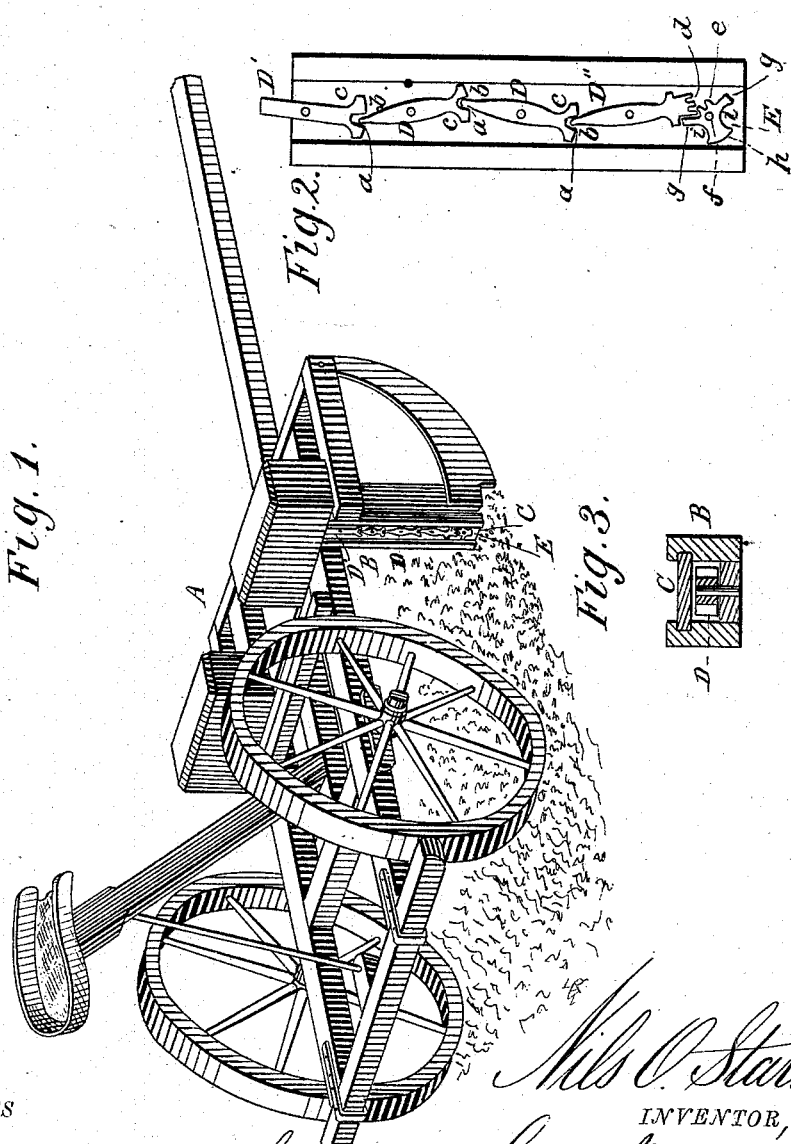
WITNESSES
Fred. G. Dieterich
John A. Tauberschmidt
Nils O. Starks,
INVENTOR,
By his Attorneys
Louis Bagger & Co.

UNITED STATES PATENT OFFICE.

NILS O. STARKS, OF NORA, WISCONSIN.

CORN-PLANTER.

SPECIFICATION forming part of Letters Patent No. 251,650, dated December 27, 1881.

Application filed June 11, 1881. (No model.)

*To all whom it may concern:*

Be it known that I, NILS O. STARKS, of Nora, in the county of Dane and State of Wisconsin, have invented certain new and useful Improvements in Corn-Planters; and I do hereby declare that the following is a full, clear, and exact description of the invention, which will enable others skilled in the art to which it appertains to make and use the same, reference being had to the accompanying drawings, which form a part of this specification, and in which—

Figure 1 is a perspective view of a corn-planter embodying my invention. Fig. 2 is a face view of the dropping device which constitutes my improvement, and Fig. 3 is a cross-section of the same.

Similar letters of reference indicate corresponding parts in all the figures.

My invention relates to riding or horse corn-planters; and it consists in the construction of an improved dropping device, as hereinafter more fully described.

In the annexed drawings, A represents the planter, with its wheels, seed-hoppers, and other appurtenances of any desired pattern or construction.

From the seed-hoppers the corn is delivered into a vertical chute or passage, B, one side of which, facing the covering-wheels and the driver's seat, is made of thick glass, C, thus permitting the driver to inspect the contents of the chute or seed-passage B C. Inside of this is arranged a series of short levers, D, the top lever, D', extending up into the seed-hopper and connecting with the reciprocating seed-slide or seed-slide bar, which alternately opens and closes the seed-aperture in the bottom of the hopper, so that lever D' and its connecting-levers are operated in conjunction with the reciprocating seed-slide or seed-slide bar. The lower end of each of the levers D' D, excepting the lowermost one, has a notch, a, at the bottom, into which is inserted the narrow top or point b of the lever next below, and on each side of the notch or recess a is a projecting lip, c, which, by striking alternately against opposite sides of the chute, limit the play of the respective levers and prevent the points or tongues b from becoming disengaged from their respective notches a.

The lowermost lever in the series (denoted by D'') has a series of cogs, d, at its lower end, which mesh with corresponding cogs, e, forming part of the combined shut-off and forcing device E, which is pivoted at f in the lower or discharge end of the chute. This device has two laterally-projecting fingers, g g, and a bottom part, h, between which and the fingers g are formed two concave recesses or seed-cups, i, one on each side.

As the seed to be planted is received into the chute B C, the levers D' D D'', operating in the manner described, will intercept it on its downward passage grain by grain until it reaches the discharge end, where it is received in one of the seed-cups i. By the next stroke of the seed-slide the position of the device E is reversed, and the grain of seed in the cup is forced by the finger or arm g, which constitutes one side of the cup, down into the hill, while the opposite seed-cup i closes the lower end of the chute and is in position to receive the next grain.

By this device waste of seed by scattering is prevented, the seed is not merely dropped but forced into the hill, choking up of the seed-chute is prevented, the seed is planted with absolute regularity, and the driver is enabled to inspect the seed-chute and watch the delivery of the seed several hills in advance of the planting.

By removing the glass slide C, which is inserted into grooves in the casing B, access may readily be had to the interior of the chute when desired.

Having thus described my invention, I claim and desire to secure by Letters Patent of the United States—

1. In a corn-planter, the combination, with the seed-box or hopper and its delivery-chute, of a series of short levers, D' D D'', provided with pointed lips b at their upper ends and laterally-projecting lips c c at their lower ends, forming a notch or recess, a, for the insertion of the lever next below in the series, substantially as and for the purpose herein shown and set forth.

2. In the delivery-chute or seed-tube of a seeding-machine, the combination of the intermediate levers, D' D D'', and oscillating device E, having the fingers $g$ $g$ and central downward-projecting part, $h$, whereby seed-cups $i$ $i$ are formed, substantially as and for the purpose herein shown and specified.

In testimony that I claim the foregoing as my own I have hereunto affixed my signature in presence of two witnesses.

NILS O. STARKS.

Witnesses:
A. B. MORRIS,
A. E. PROUDFIT.